United States Patent [19]

Matsuno

[11] 4,070,999
[45] Jan. 31, 1978

[54] GASOLINE ENGINE OF FOUR-CYCLE SPARK IGNITION TYPE

[75] Inventor: Isao Matsuno, Tachikawa, Japan

[73] Assignee: Fuji Jukogyo Kabushiki Kaisha, Tokyo, Japan

[21] Appl. No.: 563,823

[22] Filed: Mar. 31, 1975

[30] Foreign Application Priority Data

Apr. 3, 1974 Japan .................. 49-37716

[51] Int. Cl.² ............................... F02B 23/08
[52] U.S. Cl. ..................... 123/32 B; 123/59 BS; 123/191 S
[58] Field of Search ............ 123/32 B, 32 C, 32 ST, 123/32 SA, 32 SP, 37, 191 S, 191 R, 59 BS, 65 S

[56] References Cited

U.S. PATENT DOCUMENTS

| | | | |
|---|---|---|---|
| 1,799,498 | 4/1931 | Blidsoe | 123/53 |
| 2,121,813 | 6/1938 | Mitchell | 123/32 B |
| 2,234,844 | 3/1941 | Mitchell | 123/32 B |
| 2,360,943 | 10/1944 | Fischer | 123/32 B |
| 2,511,992 | 6/1950 | Quick | 123/32 B |
| 2,514,730 | 7/1950 | Sonderegger | 123/32 B |
| 3,777,724 | 12/1973 | Kiley | 123/32 B X |
| 3,897,769 | 8/1975 | Jozlin | 123/191 R |
| 3,934,560 | 1/1976 | Dodd | 123/32 B |
| 4,011,841 | 3/1977 | Sato et al. | 123/32 B |
| 4,026,250 | 5/1977 | Funiciello | 123/32 B |

FOREIGN PATENT DOCUMENTS

| | | | |
|---|---|---|---|
| 970,788 | 10/1958 | Germany | 123/32 B |
| 869,445 | 3/1953 | Germany | 123/32 B |

*Primary Examiner*—Charles J. Myhre
*Assistant Examiner*—Craig R. Feinberg
*Attorney, Agent, or Firm*—Martin A. Farber

[57] ABSTRACT

A gasoline engine of four-cycle spark ignition type comprises a piston-cylinder assembly having a piston including a partition and a combustion chamber separated into two compartments by the partition in the forward portion of the piston reciprocation, and an ignition plug set in one of the compartments in which the first combustion occurs. In this case, the ignition timing is determined in a period in which the ignited flames are retained by the partition so as not to contact the mixture in the other compartments, and the flames in the first combustion compartment are in contact with the combustible mixture in the next compartment when the compartments communicate with each other by releasing the separation of the chamber in the back portion of the piston reciprocation stroke.

7 Claims, 18 Drawing Figures

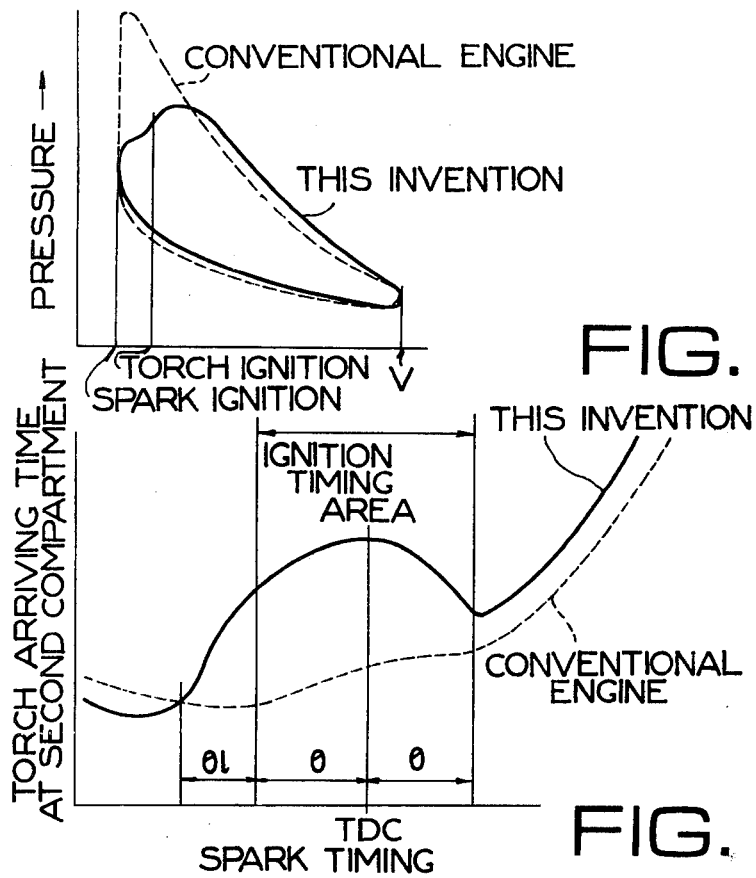
FIG. 2.
FIG. 3.
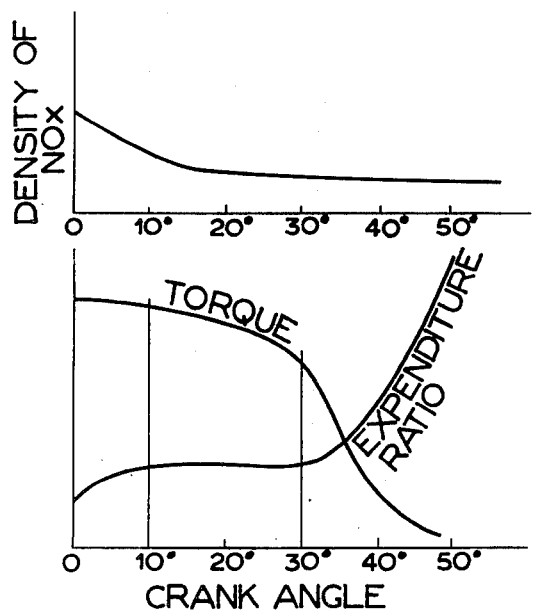
FIG. 4.

GASOLINE ENGINE OF FOUR-CYCLE SPARK IGNITION TYPE

This invention relates to a gasoline engine of four-cycle spark ignition type and more particularly to a gasoline engine improved to clean up exhaust gases with nitric-oxides reduced.

As a system for exhaust gas purification, there has been known an engine of stratified combustion type having a main chamber and a sub-chamber. This type of engine has the defective complication of a combustion control system, because of the preparation for supplying rich fuel mixture to the sub-chamber and lean fuel mixture to the main chamber respectively.

The combustion of the combustible mixture in the four-cycle gasoline engine is, as known, accomplished in a term from the end of the compression stroke to the begining of the combustion stroke as specified in a constant-volume cycle (Otto cycle) or constant-pressure and volume cycle (Sabathe cycle).

In this case, there is no doubt in thermodynamics to lower the peak of temperature in the cycle, as the combustion pattern of the engine is more accessible to the constant-pressure cycle, provided that the engine drives under a constant-thermal effeciency with a suitable compression ratio, thereby to reduce the nitric-oxides included in exhaust gases.

On the ground that the burning velocity of uniform mixture in the prior engine is a physical parameter determined by the property of mixture in a combustion chamber and so on, it is difficult to control the burning velocity freely in a wide range, though the improvements of shape of the combustion chamber and location of the ignition plug result in a slight variation of the burning velocity, so as hardly to reduce the nitric-oxides included in the exhaust gases.

An object of this invention is to provide a gasoline engine of four-cycle spark ignition type improved to bring the peak of pressure and temperature under control, with the combustion pattern being access to a constant-pressure cycle. This improved engine has stepped combustions which successively taken place by having a time delay, so that the combined combustions retain the peak of pressure and temperature under a suitable level in which the generation of nitric-oxides is sufficiently reduced in the exhaust gases.

The other features and advantages of this invention will be understood frrom the following description with reference to the accompanying drawings as follows:

FIG. 2 is a pressure indication diagram wherein an experimental curve according to this invention is duplicated on that of the prior engine of standard type;

FIG. 3 is an indication diagram for combustion rate wherein need times for flame arriving at a second combustion compartment are plotted by curve lines in accordance with the engines for this invention and conventional engine;

FIG. 4 is an indication diagram for generation of nitric-oxides according to brake torque and fuel consumption rate;

Figure 1:
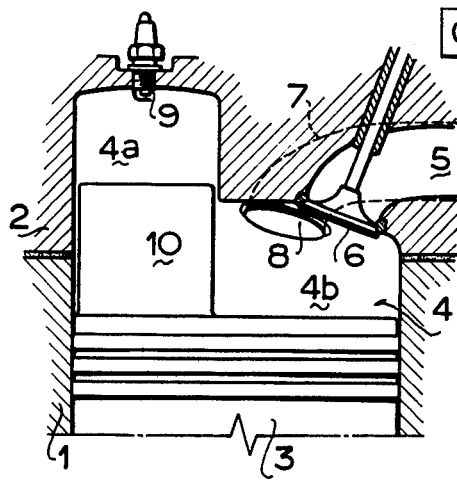
FIG. 1 is a vertical cross-section of a piston-cylinder assembly embodying the present invention.

Referring to FIG. 1, there is provided an engine, embodying the present invention, which includes a piston-cylinder assembly having a hollow cylinder 1, a cylinder head 2, a piston 3 slidably reciprocating in the cylinder 1 and a combustion chamber 4 formed in the cylinder head 2; an intake port 5 with an intake valve 6 and an exhaust port 7 with an exhaust valve 8 both opened at the ceiling portion of the chamber 4; and an ignition plug 9.

The piston 3 includes a partition 10 formed into an auxiliary piston or subpiston integral to the top thereof, and the combustion chamber 4 is separated into two compartments or combustion spaces 4a and 4b when the partition 10 is slidably fitted to the compartment 4a in the forward portion of the piston reciprocation. The ignition plug 9 is disposed in the compartment 4a.

The other parts of the engine are removed from the drawing for avoiding complicated illustration.

In operation, the valve 6 opens the intake port 5 to communicate it with the combustion chamber 4, and then the mixture is sucked in the chamber 4 being expanded in the back portion of the piston reciprocation for admission stroke.

Near the bottom dead center of the piston stroke, the valve 6 closes the port 5 to intercept the communication with the chamber 4, and the piston 3 is upwardly moved for the compression stroke. In the halfway position of the forward portion of the piston reciprocation, the sub-piston 10 is slidably inserted into the compartment 4a and separates the chamber into two isolated compartments 4a and 4b.

Near the top dead center of the piston stroke, the ignition plug 9 is energized to fire the combustible mixture in the compartment 4a and to introduce the piston into a backward motion. After the ignition and when the compartments 4a and 4b communicate with each other in the back portion of the piston reciprocation, the flame developed in the compartment 4a extends to the interior of the compartment 4b, so as to ignite the combustible mixture in the compartment 4b.

When the stepped combustions in both compartments are combined with each other, the curve of pressure, as shown in FIG. 2, has two peaks positioned in a suitable level in which the nitric-oxides are sufficiently reduced in the exhaust gases. In this case, the peaks of the curve are adequately lowered in comparison with that of the prior engine of which the curve is indicated as a dotted line in FIG. 2 and by which the nitric-oxides are rather generated.

Near the bottom dead center of the piston stroke, the exhaust valve 8 opens the port 7 to communicate it with the chamber 4 and then the forward portion of the piston reciprocation for exhaust stroke is started.

The ignition timing of the plug 9 should be decided under such consideration that the mixture of the compartment 4b is ignited before the deenergization of the ignited mixture in the compartment 4a, while a time lag for ignition is maintained by the partition 10 which temporarily prevents the flame from developing continuously from the compartment 4a to the compartment 4b without any resistance.

In order to delay the combustion time, the ignition timing has better to be selected within a region limited in the separation period ($2\theta$) of the chamber 4 and the slight preceding time ($\theta l$) in reason of combustion rate as shown in FIG. 3 wherein the flame in the first ignition compartment 4a extends to the second combustion compartment 4b through a clearance between the periphery of the sub-piston 10 and the inner wall of the compartment 4a as indicated by a curve line. In this case, the curve for this invention is distinguished from that of the conventional engine which is also illustrated in the same figure.

For maintaining the high power and low expenditure as well as clarified exhaust gases, the indication of FIG. 4 teaches that timings, at which the chamber 4 is separated into two compartments 4a and 4b by the partition 10 and the separation is released, should be determined in regions defined by 10° to 30° of crank angles before and after the top dead center of the piston stroke.

In this embodiment, part of the exhaust gases remains in the compartment 4a due to the insertion of the sub-piston 10 into the compartment 4a in the forward portion of the piston reciprocation in the exhaust stroke. The remaining exhaust gases dilute the mixture newly supplied to the chamber 4 during the back portion of the piston reciprocation for admission stroke, so as to obtain the exhaust gas recirculation.

Figure 7:
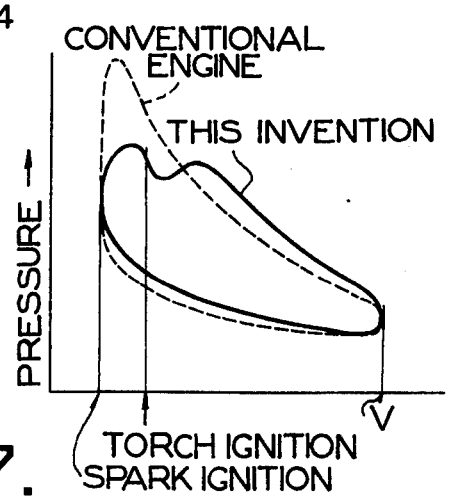
FIG. 7 is a pressure indication diagram wherein an experimental curve according to this invention is duplicated on that of the prior engine of standard type.

If the compartment to be first ignited has the mixture volume larger than that of the other compartment, the curve of pressure is traced as shown in FIG. 7 wherein the first peak of the curve is higher than that second one. Therefor, the ignition plug 9, though it is disposed in the compartment 4a in the first embodiment, may be located in the compartment 4b as shown in FIG. 5 wherein the mixture is the first ignited in the compartment 4b and consequently the mixture in the compartment 4a is inflamed after a delay time.

Figure 6:
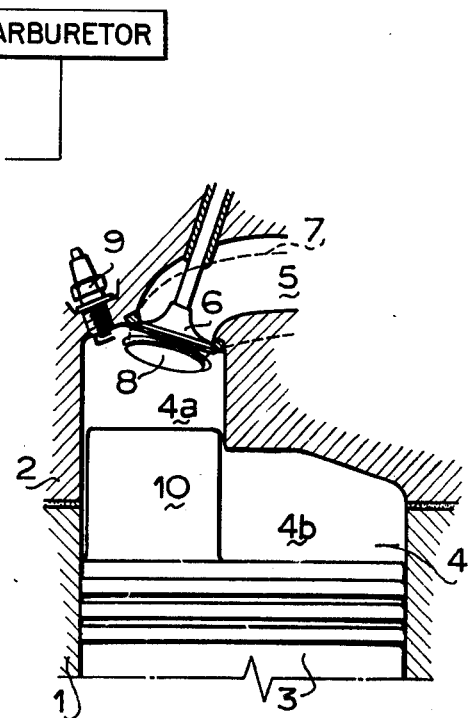
FIG. 6 is a vertical cross-section of a piston-cylinder assembly further modified from that of FIG. 1.
Figure 5:
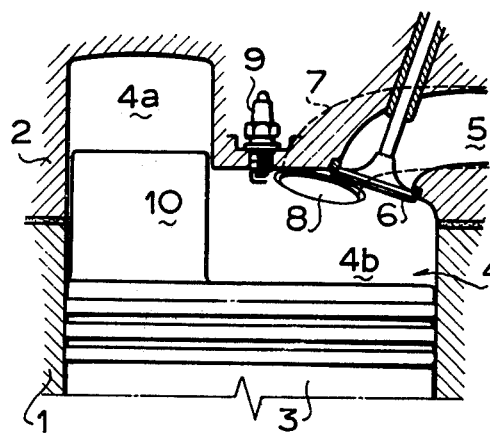
FIG. 5 is a vertical cross-section of a piston-cylinder assembly modified from that of FIG. 1.

FIG. 6 indicates an embodiment modified from that of FIG. 5. This embodiment includes a compartment 4a made in the larger form than a compartment 4b, and intake and exhaust ports 5 and 7 communicate with the former compartment 4a which further includes an ignition plug 9.

In these embodiment, the mixture of the second combustion compartment may be kept in a compression higher than that of the ignition combustion compartment at the top dead center of the piston stroke, so that this pressure gap generates the flow of the mixture passing through a clearance between peripheries of the sub-piston 10 and the corresponding compartment so as to make a turbulence in which the mixture in the ignition compartment prevails in front of peak ignition, thereby to improve the ignition propensity.

Figure 8:
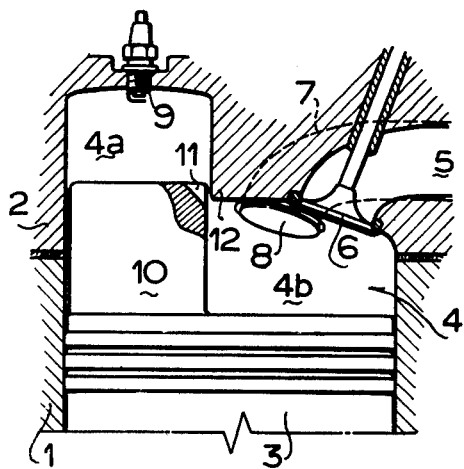
FIG. 8 is a vertical cross-section of a piston-cylinder assembly included in the second embodiment according to this invention.
Figure 9:
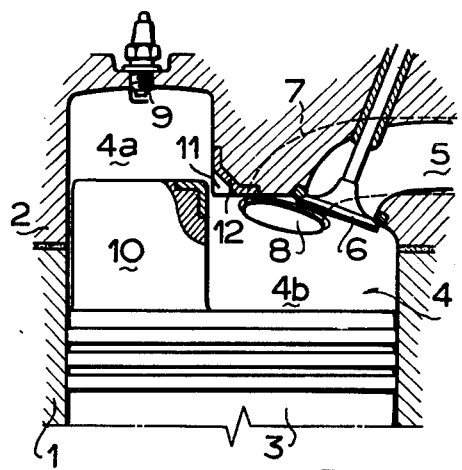
FIG. 9 is a vertical cross-section of an embodiment modified from that of FIG. 8.

For making the positive turbulence, there is provided a passage through which the compartments are communicated with each other in the first and last moments of separation of the chamber. The passage consists of a cut-off portion 11 formed at the forward edge of the partition 10 as shown in FIG. 8, or at a border 12 for compartments as shown in FIG. 9. The embodiment of FIG. 8 includes a compartment 4b enlarged over the cylinder bore in the transverse direction. And the embodiment of FIG. 9 includes heat resisting metals partially or wholly coating the forward edge of the sub-piston 10 and the border 12.

Figure 10:
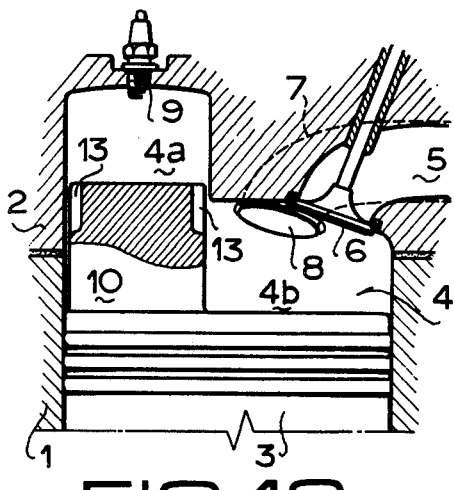
FIG. 10 is a vertical cross-section of an embodiment further modified from that of FIG. 8.
Figure 11:
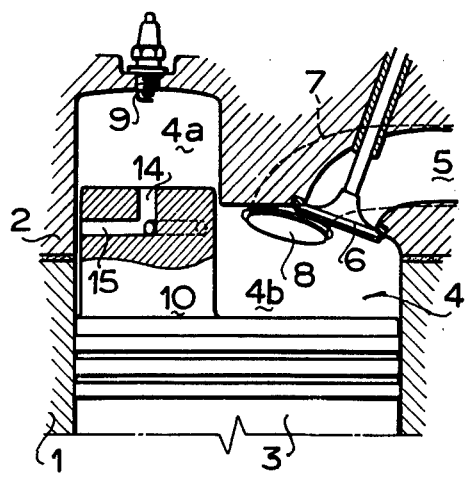
FIG. 11 is a vertical cross-section of an embodiment still further modified from that of FIG. 8.

The passage may consist of a plurality of grooves 13 formed on the periphery surface of the sub-piston 10 as shown in FIG. 10, or consist of a main path 14 and radial extending paths 15 formed in the sub-piston 10 in a manner to be communicated with each other as shown in FIG. 11. The main path 14 is opened to the compartment 4a and the radial paths 15 are opened to the other compartment 4b at the periphery of the sub-piston 10 in the first and last moments of separation of the chamber 4. These embodiments both are available to make the turbulence in the ignition combustion chamber.

Figure 12:
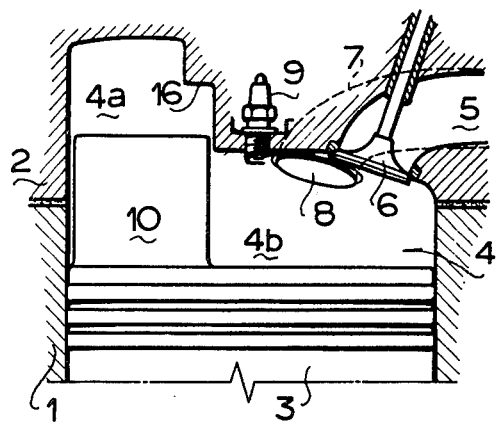
FIG. 12 is a vertical cross-section of a piston-cylinder assembly included in the third embodiment according to this invention.

FIG. 12 indicates a modification from the first embodiment. An engine illustrated in FIG. 12 is distinguished from the other embodiments by having a skittish area 16 located in the compartment 4a. The skittish area 16 is specially formed into a step-shape having a flat surface facing the top of the partition 10. In the compartment 4a, when the top of the partition 10 is carried across to the flat surface in the final stage of the forward portion of the piston reciprocation for compression stroke, the mixture is skittish from the area 16 to the remaining space and stired by the irregular motion itself. Such stiring is available to improve the combustibility of the mixture, more particularly in the case where the lean-set mixture is used.

Figure 13:
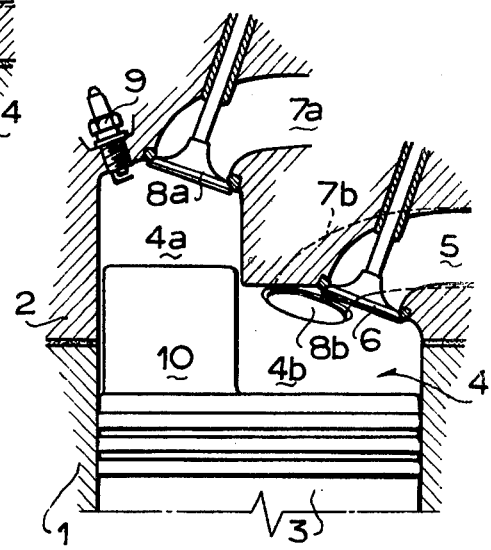
FIG. 13 is a vertical cross-section of a piston-cylinder assembly included in the fourth embodiment according to this invention.

FIG. 13 indicates an embodiment formed to be capable of completely scavenging the combustion chamber. An engine in this embodiment has two exhaust ports with the corresponding valves 8a and 8b, one of which is communicated with the first combustion compartment 4a, and the other of which is communicated with the second combustion compartment 4b. Accordingly, the remaining exhaust gases in the compartment 4a for the separation of the chamber 4 is put out to the exhaust path through the corresponding port until the piston 3 and sub-piston 10 arrive at the top dead center of the piston stroke and the exhaust valve 8a is shut in. In this case, the exhaust valve 8b also is shut in the same timing as the valve 8a.

Figure 14:
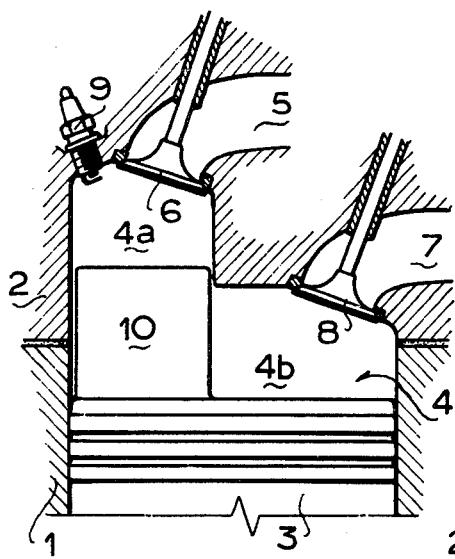
FIG. 14 is a vertical cross-section of a piston-cylinder assembly included in the fifth embodiment according to this invention.

FIG. 14 indicates an engine wherein an intake port 5 having an intake valve 6 is communicated with the first combustion compartment 4a and an exhaust port 7 having an exhaust valve 8 with the second combustion compartment 4b.

Accordingly, the compartment 4a is kept with a mixture body which is not diluted by the remaining exhaust gases existing in the chamber 4 because the mixture body is supplied to the compartment at a final stage of the back portion of the piston reciprocation though the mixture supplied in the compartment 4b is diluted by the remaining exhaust gases, so that the combustibility in the compartment 4a, even though the mixture is lean-set, is adequately maintained.

This type of engine further has an advantage in that the intake valve 6 is capable of opening the intake port 5 before the sub-piston 10 is inserted into the compartment 4a so that due to the insertia of exhaustion the remaining exhaust gases in the compartment 4a flows to the compartment 4b and then to the exhaust port 7, and the compartment 4a is scavenged with the mixture progressively supplied before the separation of the chamber 4.

Figure 15:
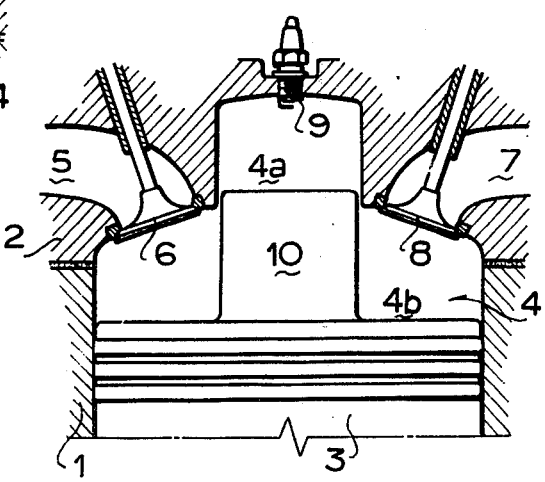
FIG. 15 is a vertical cross-section of a piston-cylinder assembly included in the sixth embodiment according to this invention.

In the above-mentioned embodiments, the compartments 4a and 4b may be formed as shown in FIG. 15, in the cylinder head 2 to shape stepped bores, which are arranged coaxially to the cylinder bore so that the combustion forces the piston 3 along or near its center line.

Figure 16:
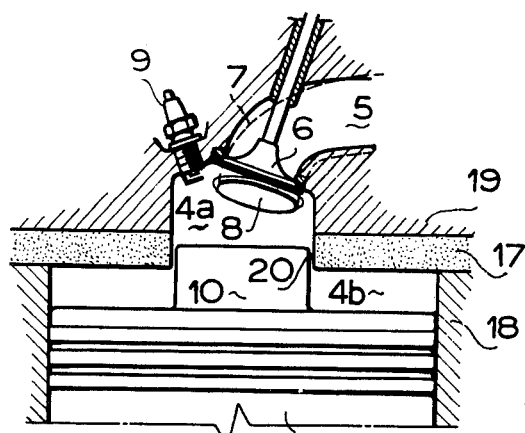
FIG. 16 is a vertical cross-section of an embodiment modified from that of FIG. 15.

In order to use the improved construction of this invention with the prior engine in simple modification, there may be provided a spacer plate 17 disposed between the cylinder block 18 and cylinder-head block 19. The spacer plate 17 has a bore 20 through which the sub-piston 10 is slidably penetrated, so that the chamber 4 is separated into two compartments 4a and 4b, one of which is simply located in the cylinder block 18, the other of which is located in the cylinder-head block 19 with ports and ignition plug. Such embodiment is illustrated in FIG. 16.

Figure 17:
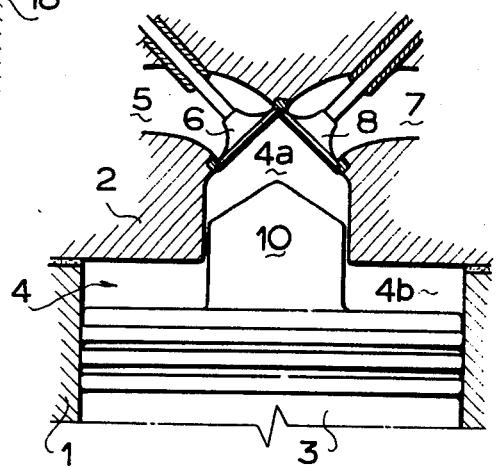
FIG. 17 is a vertical cross-section of an embodiment further modified from that of FIG. 15.

A sub-piston 10 shown in FIG. 17 has a conical top in a manner to reduce the space of the compartment 4a at the top dead center of the piston stroke, with bores for intake and exhaust valves being formed in the compartment 4a, so that the mixture in the compartment 4a has a high compression pressure which results in the improved combustibility.

Figure 18:
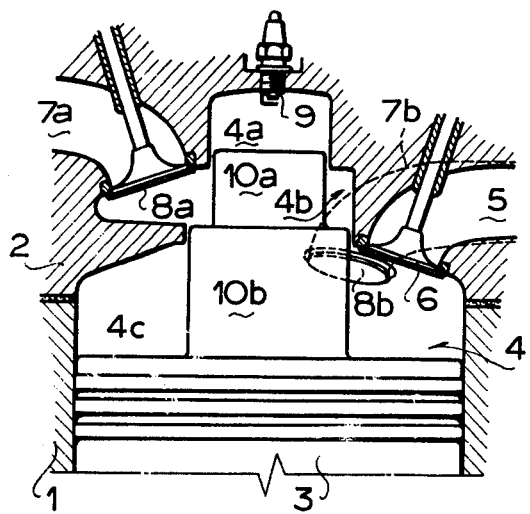
FIG. 18 is a vertical cross-section of a piston-cylinder assembly included in the seventh embodiment according to this invention.

Another embodiment of this invention is illustrated in FIG. 18 wherein there are provided a piston 3 including two partitions 10a and 10b having different diameters and arranged tandem on the axial line of the piston or cylinder bore, a combustion chamber 4 separated into three compartments 4a, 4b and 4c by the partitions 10a and 10b, and a plug 9 disposed in the compartment 4a.

An intake port 5 with an intake valve 6 is communicated with the compartment 4c, and two exhaust ports 7a and 7b with two exhaust valves 8a and 8b are communicated with the compartments 4b and 4c.

In this case, the compartment 4a is isolated from both the exhaust ports after the combustion chamber is separated into the compartments in the forward portion of the piston reciprocation for the exhaust stroke, so that the exhaust gases shut in the compartment 4a spreads in the chamber 4 during the back portion of the piston reciprocation performing the admission stroke so as to dilute the mixture.

The compartment 4a by ignition of the plug 9 is the first energized within the separation of the chamber 4, and the adjacent compartment 4b is torch-ignited by the flame extending from the compartment 4a to the compartment 4b when the separation between them ends, and finally the compartment 4c is ignited when the separation between the compartments 4b and 4c ends. Such operation occurs in the back portion of the piston reciprocation for the combustion stroke.

The operation of such embodiment is approximately the same as or identical with that of the other embodiments mentioned above, except of the step numbers of the respective combustions according to the compartments 4a to 4c.

The engine according to this invention allows the use of a lean-set mixture to that the exhaust gases have very slight hydrocarbon and carbon monoxide content as well as slight nitric oxides which is obtained by means of this invention.

Hereinafter the term —combustion space— means "combustion compartment."

What is claimed is:

1. A method of operating a gasoline-powered internal combustion engine having a combustion chamber, comprising the steps of
   supplying for all engine loads over the full range of engine operation a homogeneous air-fuel mixture into the entire combustion chamber through an intake means in an intake stroke before a separation of the combustion chamber,
   subsequently separating the combustion chamber into temporarily non-communicating first and second combustion spaces near a top dead center for a range starting and ending, respectively within a crank angle 10° to 30° before and after the top dead center, and
   igniting air-fuel mixture in one of the combustion spaces by spark plug means located in said combustion chamber initiating combustion of the air-fuel mixture in one of the combustion spaces when said first and second combustion spaces are non-communicatingly separated,
   subsequently communicating said first and second combustion spaces with each other at an initial stage of the expansion stroke of a piston causing flame propogation from said one of said combustion spaces into the air-fuel mixture in the other of said combustion spaces at a delayed time instant for igniting the air-fuel mixture in the second combustion space by the flame from the first ignited combustion space to cause divisional combustion to occur to decrease maximum combustion temperature.

2. A gasoline-powered internal combustion engine of four cycle type, comprising
   a cylinder including a cylinder head having an inner wall defining a pocket,
   intake means and exhaust means for said cylinder, said intake means including a carburetor, an intake part and an intake valve operatively connected to one another,
   main piston means disposed for reciprocal operation in said cylinder,
   auxiliary piston means projecting from said main piston means and disposed for reciprocal operation into said pocket for non-communicatingly separating the pocket,
   said cylinder head defining a combustion chamber between said cylinder head and said main piston means, said combustion chamber being divided into non-communicatingly separated first and second combustion spaces, respectively, which are defined between said main piston means and said cylinder head, and between said inner wall of said pocket and said auxiliary piston means, respectively, when said auxiliary piston means is in said pocket, and said auxiliary piston means for non-communicatingly separating said first and second combustion spaces from each other for a predetermined time period starting and ending respectively when said main piston means is within 10°–30° before and after a top dead center of a piston stroke thereby forming an independent second combustion space, said intake means for supplying for all engine loads over the full range of engine operation homogeneous air-fuel mixture into the entire of said combustion chamber through said intake means in an intake stroke of said main piston means prior to the separation of said combustion chamber into said first and second combustion spaces, spark plug means disposed in said combustion chamber for initiating combustion of the air-fuel mixture in one of said non-communicatingly separated combustion spaces when said first and second combustion spaces are non-communicatingly separated when said auxiliary piston means is in said pocket, said auxiliary piston means for subsequently communicating said first and second combustion spaces with each other at an initial stage of an expansion stroke to permit flame propogation from said one of said combustion spaces into the air-fuel mixture in the other of said combustion spaces at a delayed time instant, whereby homogeneous air-fuel mixture is introduced into said combustion chamber before separation of said combustion chamber and whereby the mixture of said one of said combustion spaces is ignited by said spark plug means during the predetermined time period of separation of said combustion chamber and the mixture in the other combustion space is burned thereafter by the flame from the ignited said one combustion space causing divisional combustion to decrease a maximum combustion temperature.

3. The engine, as set forth in claim 2, wherein said intake means and said exhaust means are disposed to said second combustion space.

4. The engine, as set forth in claim 3, wherein said spark plug means is disposed in said second combustion space.

5. The engine, as set forth in claim 2, wherein said intake means and said exhaust means are disposed in said first combustion space.

6. The engine, as set forth in claim 5, wherein said spark plug means is disposed in said first combustion space.

7. The engine, as set forth in claim 5, wherein said spark plug means is disposed in said second combustion space.

* * * * *